(12) United States Patent
Sridharan et al.

(10) Patent No.: US 9,047,192 B2
(45) Date of Patent: Jun. 2, 2015

(54) SIGNATURE-BASED STORE CHECKING BUFFER

(71) Applicant: Advanced Micro Devices, Inc., Sunnyvale, CA (US)

(72) Inventors: Vilas Sridharan, Brookline, MA (US); Sudhanva Gurumurthi, Watertown, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 213 days.

(21) Appl. No.: 13/724,987

(22) Filed: Dec. 21, 2012

(65) Prior Publication Data

US 2014/0181594 A1    Jun. 26, 2014

(51) Int. Cl.
| G06F 11/00 | (2006.01) |
| G06F 11/08 | (2006.01) |
| G06F 11/10 | (2006.01) |
| G06F 17/30 | (2006.01) |
| G06F 11/16 | (2006.01) |

(52) U.S. Cl.
CPC .......... *G06F 11/08* (2013.01); *G06F 11/1004* (2013.01); *G06F 17/30743* (2013.01); *G06F 11/167* (2013.01)

(58) Field of Classification Search
CPC .......... G06F 11/1004; G06F 11/167; G06F 17/30743
See application file for complete search history.

(56) References Cited

U.S. PATENT DOCUMENTS

| 2009/0327818 A1* | 12/2009 | Kogelnik ................. 714/49 |
| 2010/0275063 A1* | 10/2010 | Walmsley et al. ........... 714/32 |
| 2012/0239175 A1* | 9/2012 | Mohajer et al. ............ 700/94 |
| 2012/0266022 A1* | 10/2012 | Kydles et al. ............. 714/32 |

* cited by examiner

*Primary Examiner* — Charles Ehne
(74) *Attorney, Agent, or Firm* — Volpe and Koenig, P.C.

(57) ABSTRACT

A system and method for optimizing redundant output verification, are provided. A hardware-based store fingerprint buffer receives multiple instances of output from multiple instances of computation. The store fingerprint buffer generates a signature from the content included in the multiple instances of output. When a barrier is reached, the store fingerprint buffer uses the signature to verify the content is error-free.

20 Claims, 4 Drawing Sheets

SIGNATURE-BASED STORE CHECKING BUFFER

STATEMENT REGARDING FEDERALLY-SPONSORED RESEARCH AND DEVELOPMENT

This invention was made with U.S. Government support under Prime Contract Number DE-AC52-07NA27344, Subcontract Number B600716 awarded by the Department of Energy (DOE). The U.S. Government has certain rights in this invention.

BACKGROUND

1. Field

The embodiments are generally directed to data verification using redundant computations, and more specifically to optimizing data verification in hardware.

2. Background Art

There are several approaches to data verification through fault tolerance, in particular information redundancy, spatial redundancy and temporal redundancy. Information redundancy uses coding techniques, such as parity and error correction codes to detect and recover from data errors. Spatial redundancy duplicates the hardware that requires protection. Temporal redundancy involves replicating the computation and running the replicated computational logic on the same hardware.

When redundancy is used by processors of an electronic device, redundant data requires comparison and analysis. A bit by bit comparison, however, is often inefficient and wastes resources of the electronic device.

BRIEF SUMMARY OF EMBODIMENTS

A system and method for optimizing redundant output verification, are provided. A hardware-based store fingerprint buffer receives multiple instances of output from multiple instances of computation. The store fingerprint buffer generates a signature from the content included in the multiple instances of output. When a barrier is reached, the store fingerprint buffer uses the signature to verify the content is error-free.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
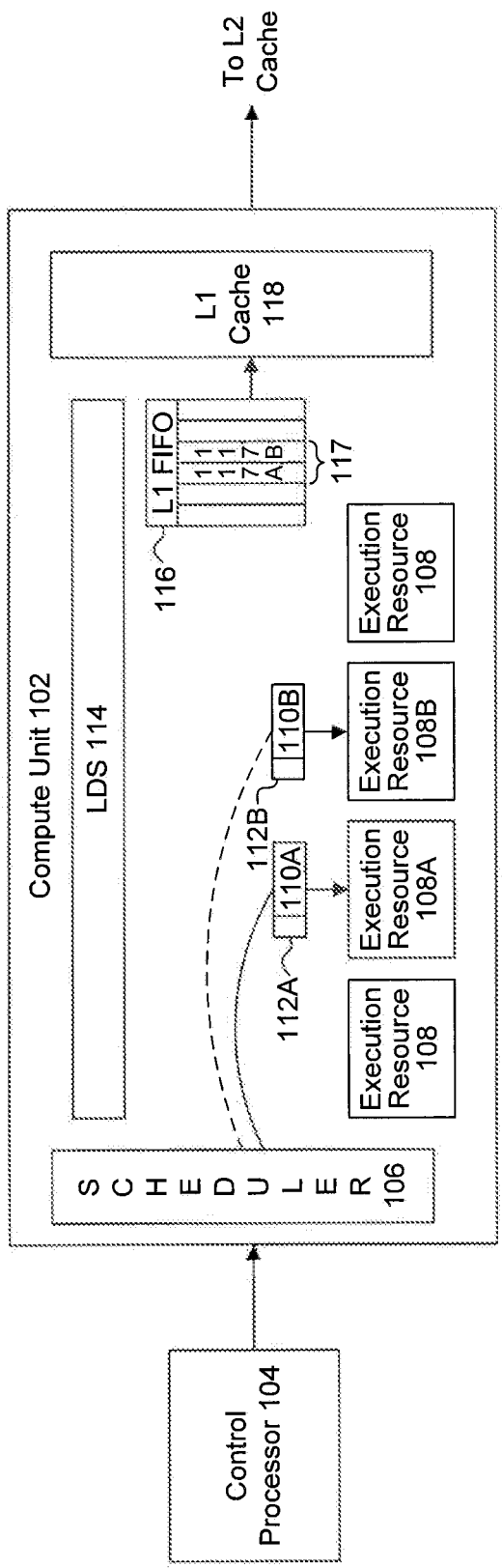
FIG. 1 is a block diagram of redundant computation hardware in a compute unit, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Electronic devices process data and provide thousands of applications to the users. Example electronic devices include, but are not limited to, mobile phones, personal computers, workstations, and game consoles. Electronic devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In the GPGPU computing, a GPU performs computations that traditionally were handled by a CPU. When GPGPU computing is used in large scale systems to process data, a GPU needs to tolerate computational faults without causing application errors and system crashes. In an embodiment, the fault tolerance and verification mechanism may be implemented without introducing significant changes to the existing architecture of the GPU.

In an embodiment, a GPU includes one or more compute units that process data. A compute unit includes arithmetic logic units (ALU's) and other resources that process data on the GPU. Data can be processed in parallel within and across compute units.

In an embodiment, a control processor on a GPU schedules task processing on compute units. Tasks include computation instructions. Those computation instructions may access data stored in the memory system of an electronic device and manipulate the accessed data. In an embodiment, the data may be stored in a volatile or non-volatile memory. Example volatile memory includes a random access memory (RAM). Volatile memory typically stores data as long as electronic device receives power, as described above. Example non-volatile memory includes read-only memory, flash memory, ferroelectric RAM (F-RAM), hard disks, floppy disks, magnetic tape, optical discs, etc. Non-volatile memory retains its memory state when the electronic device loses power or is turned off.

To ensure computational reliability of data, a hardware-based processor performs data verification using computational redundancy. Computational redundancy in hardware may be performed at various points in a hardware-based processor, such as the GPU, and is described in detail below. Although the embodiments below are described in terms of a GPU, the embodiments are illustrative. The subject matter is not limited to a GPU, but rather to processors within electronic device that process and stream data.

FIG. 1 is a block diagram 100 of a system that performs data verification within a compute unit, according to an embodiment. A compute unit 102 included in FIG. 1 is located within a GPU, although an implementation is not limited to this embodiment.

Compute unit 102 receives and processes tasks scheduled for processing by control processor 104. Control processor 104 may schedule tasks from a CPU or a GPU executing on the electronic device. Control processor 104 divides tasks into multiple workgroups. Each workgroup includes multiple wavefronts. A wavefront includes multiple threads, where each thread can execute in parallel with other threads on compute unit 102. Threads include executable code or instructions and that are processed by execution resources 108. There may be 64 threads in a wavefront, although the implementation is not limited to this embodiment. When compute unit 102 receives workgroups, compute unit 102 processes the code in the wavefronts.

Compute unit 102 includes a scheduler 106, execution resources 108, a memory buffer implemented as level one FIFO 116 ("L1 FIFO 116"), and a memory cache implemented as level one read/write cache 118 ("L1 cache 118").

Scheduler 106 in compute unit 102 schedules workgroups for processing on execution resources 108. Execution resources 108 are implemented in hardware and may be arithmetic logic units (ALUs) that include one or more single instruction multiple data units (SIMD units), scalar units, branch units and memory units. To improve computational reliability, scheduler 106 includes hardware that creates multiple instances of computation for each workgroup. In an embodiment, these instances include the same code that accesses and processes the same data. These instances are referred to as instances of computation or computations 110. For example, in FIG. 1, scheduler 106 creates two instances of computation 110, such as computations 110A and 110B.

To differentiate between instances of computation 110, scheduler 106 creates a distinguishing tag 112, and associates tag 112 with each instance of computation 110. Example tags 112 are tag 112A for computation 110A and tag 112B for computation 110B.

In an embodiment, tag 112 may be a single bit tag. In this embodiment, tag 112A may be set to "1" and tag 112B may be set to "0".

Tags 112 associated with instances of computation 110 also indicate an instance of computation 110 that is a primary instance. For example, computation 110A associated with tag 112A may be designated as a primary instance (also referred to as a "leading" instance), and computation 110B associated with tag 112B may be designated as a secondary instance (also referred to as the "trailing" instance).

Execution resources 108 process instances of computation 110. For example, in FIG. 1, execution resource 108A may process computation 110A and execution resource 108B may process computation 110B.

As execution resources 108 process instances of computation 110, execution resources 108 may generate instances of output 117. Instances of output 117 may also include the storage address in a memory system accessible to the GPU to store the generated data. In an embodiment, the data and the storage address for storing the data included in instances of output 117 may be referred to as content. In an embodiment, each instance of computation 110 generates an instance of output 117. For example, instance of output 117 generated from computation 110A may be referred to as output 117A, and instance of output 117 generated from computation 110B may be referred to as output 117B.

Before instances of output 117 is stored in the memory system, execution resources 108 may store instances of output 117 in L1 FIFO 116. L1 FIFO 116 is a memory buffer that may be implemented as a queue, though an implementation is not limited to this embodiment. L1 FIFO 116 may be volatile or non-volatile memory described above. L1 FIFO 116 connects to L1 cache 118 in compute unit 102.

When instances of output 117 pass through L1 FIFO 116, instances of output 117 may be propagated to L1 cache 118. L1 cache 118 may be a volatile memory in compute unit 102 that stores instances of output 117 before instances of output 117 are transferred to the non-volatile memory system or other components in the GPU.

In one embodiment, compute units 102 also include a local data store 114 ("LDS 114".) LDS 114 is a memory structure local to compute unit 102. In an embodiment, LDS 114 is controlled by software. Additionally, LDS 114 may be used to temporarily store data generated during processing instances of computation 110.

In an embodiment, to ensure that the content of instances of output 117 does not contain data errors, compute unit 102 verifies data and storage address in instances of output 117 against each other. Instead of a conventional brute force approach that performs a bit by bit comparison of the content in instance of output 117 against other instances of output 117, compute unit 102 may include a specialized hardware, such as a store fingerprint buffer described below, to compare instances of output 117.

The store fingerprint buffer may compare instances of output 117 at different points in the system described in FIG. 1. In one embodiment, instances of output 117 may be compared before the instances arrive in L1 FIFO 116. If the verification is successful, the leading output 117 is propagated to L1 cache 118. In another embodiment, instances of output 117 may be compared before or after the instances are stored in L1 cache 118. If the verification is successful, output 117 identified as a leading output 117 may be propagated to L2 cache, discussed below.

Figure 2:
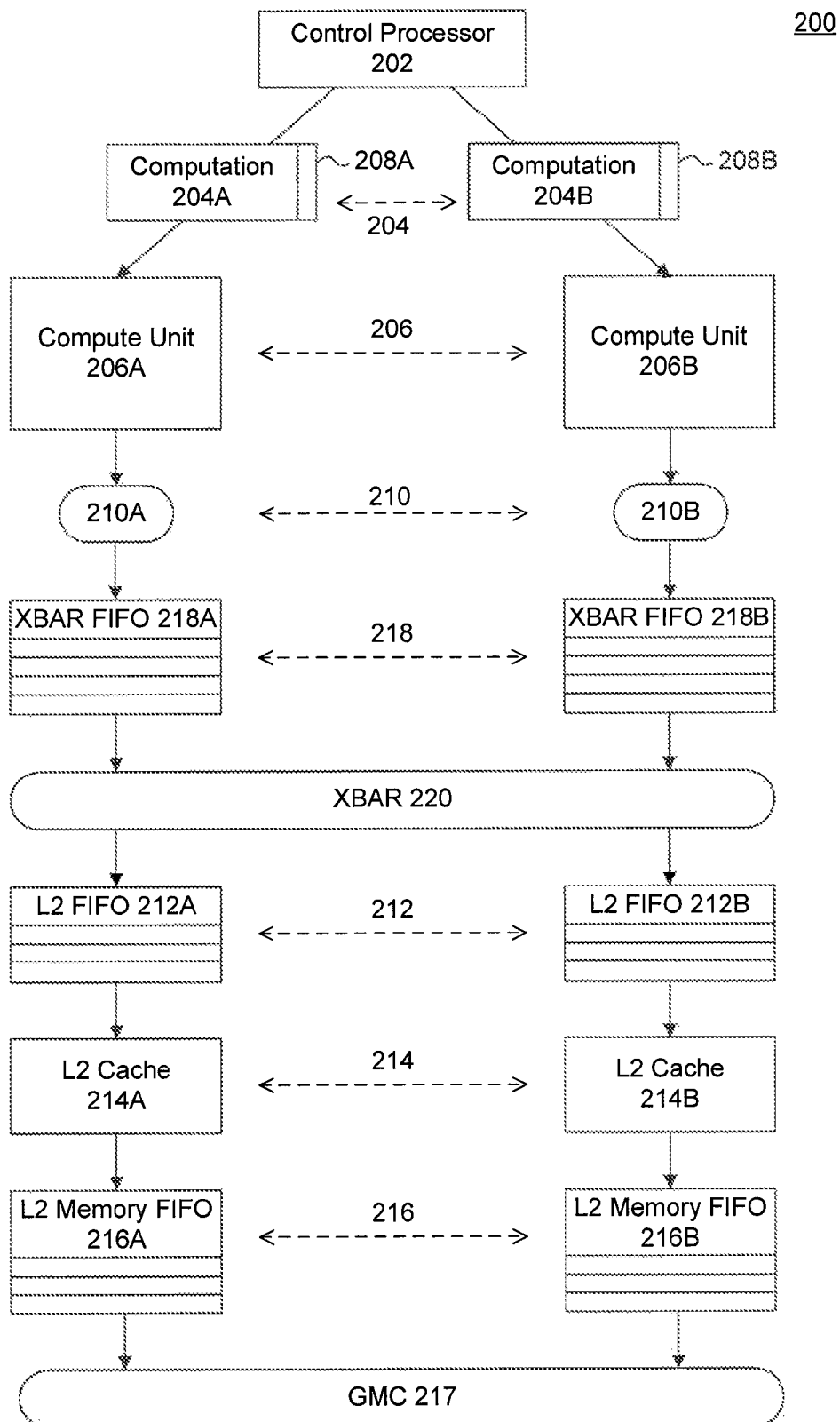
FIG. 2 is a block diagram of redundant computation hardware in a graphics processing unit, according to an embodiment.

FIG. 2 is a block diagram 200 of redundant computation hardware in a graphics processing unit, according to an embodiment. Block diagram 200 includes a control processor 202 and multiple compute units 206. Control processor 202 is similar to a control processor 104 described above. Additionally, control processor 202 also divides tasks into multiple workgroups. To perform data verification using redundancy, control processor 202 generates multiple instances of computation 204 for each workgroup, and dispatches each instance of computation 204 for processing to a different compute unit 206. In an embodiment, computations 204 have the same set of instructions that access the same input data. For example, control processor 202 may generate two instances of computation 204, such as computation 204A and computation 204B. Once generated, control processor 202 dispatches computation 204A for processing on compute unit 206A and computation 204B on compute unit 206B.

As discussed in FIG. 1, instances of computation 204 are distinguished using tags 208. Tag 208 may be a single bit that is appended to each computation 204, in one embodiment. For example, in FIG. 2, tag 208A is associated with computation 204A, and tag 208B is associated with computation 204B. In an embodiment, tag 208 identifies a leading computation, in the same manner as discussed in FIG. 1. For example, tag 208A may identify computation 204A as a leading computation and tag 208B may identify computation 204B as a trailing computation.

Compute unit 206 includes hardware and memory for processing instances of computation 204. Each compute unit 206 process an instance of computation 204 independently of other compute units 206 that process other instances of computation 204. For example, compute unit 206A processes computation 204A independently of compute unit 206B that processes computation 204B.

Instances of computation 204 generate instances of output 210. As described above, the content in output 210 may include data and the storage address of the data in the memory system. In an embodiment, computation 204A generates output 210A and computation 204B generates output 210B. Moreover, tags 208 appended to instances of computation 204 are propagated to output 210 to identify output 210 generated by a leading or trailing computation 204. For example, because computation 204A is designated as a leading computation 204, output 210A is designated as a leading output.

Instances of output 210 are verified in the GPU before the data in output 210 is accessible to other processors in the electronic device. If the verification is successful (for example the output of computation 204A is the same as the output of computation 204B) the leading instance of output 210 updates the memory system. If the verification fails, the GPU raises an exception and initiates a recovery action. In one embodiment, a recovery action restores the memory state to a previously successful verification point before the GPU re-executes computations 204A and 204B.

To ensure that compute units 206 produce the same output when compute units 206 process different instances of computations 204, each compute unit 206 processes instance of computation 204 using the same input data. For example, compute unit 206A receives the same input data for processing computation 204A, as compute unit 206B for processing computation 204B.

Once compute units 206 complete processing instances of computation 204, instances of output 210 generated by instances of computation 204 may be verified at different points in the GPU. For example, output 210 may queued for storage in a memory system by a graphics memory controller 217 (also referred to as "GMC 217") by way of a level two FIFO 212 (also referred to as "L2 FIFO 212"), a level two cache 214 (also referred to as "L2 cache 214") and level two memory FIFO 216 (also referred to as "L2 memory FIFO 216".) In an embodiment, verification may occur before or after L2 FIFO 212, L2 cache 214 and L2 memory FIFO 216.

L2 FIFO 212 is a memory buffer that queues instances of output 210 produced by compute units 206 prior to storing instances of output 210 in L2 cache 214. In an embodiment, there are multiple L2 FIFOs 212 that connect to L2 cache 214. In FIG. 2, L2 FIFO 210A and L2 cache 214A store output 210A, and L2 FIFO 210B and L2 cache 214B store output 210B.

When output 210 leaves compute unit 206, output 210 may be queued in memory buffers, such as XBAR FIFOs 218. In an embodiment, XBAR FIFO 218A stores output 210A and XBAR FIFO 218B stores output 210B. XBAR FIFOs 218 store instances of output 210 that are queued for transmission through a cross bar 220 (also referred to as XBAR 220) to one of L2 FIFOs 212. In an embodiment, cross bar 220 is a switch that routes instances of output 210 to a particular L2 FIFO 212.

In an embodiment, to ensure that the content of instances of output 210 does not contain data errors, the GPU may use the store fingerprint buffer to compare instances of output 210 at different points in the system described in FIG. 2. In one embodiment, instances of output 210 may be compared before the instances arrive in L2 FIFO 212. If the verification is successful, the leading output 210 is propagated to L2 FIFO 212. In another embodiment, instances of output 210 may be compared before the instances are stored in L2 cache 214. If the verification is successful, output 210 identified as a leading instance of output 210 stores its content in L2 cache 214. In another embodiment, instances of output 210 may be compared before the instances are propagated to L2 memory FIFO 216. If the verification is successful, the leading instance of output 210 is stored in the memory system by the graphics memory controller 217.

Figure 3:
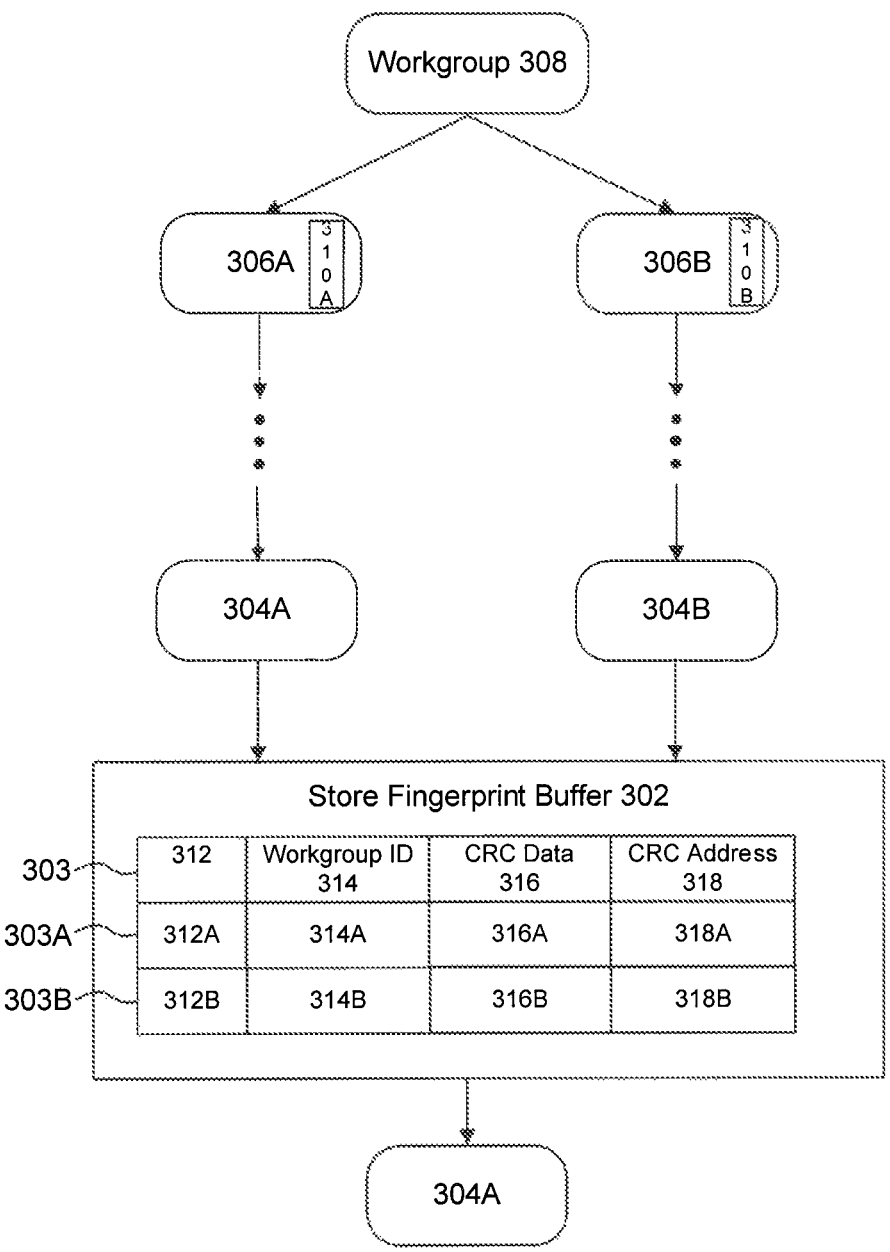
FIG. 3 is a block diagram of a store fingerprint buffer, according to an embodiment.

FIG. 3 is a block diagram 300 of a store fingerprint buffer, according to an embodiment. Store fingerprint buffer 302 (also referred to as "SFB 302") is a hardware structure that verifies output 304 from instances of computation 306. SFB 302 may be located on a GPU or another processor. As described above, instances of computation 306 are generated from workgroup 308. Workgroup 308 may be a workgroup described FIGS. 1 and 2. Instances of computation 306 may be the same or different instances of computation as computations 110 in FIG. 1 and computations 204 in FIG. 2. Each instance of computation 306 includes tag 310. Tags 310 differentiate instances of computation 306 and identify a leading and a trailing computation 306. Tags 310 may be tags 112 or tags 208 described above. In an embodiment, there may be multiple instances of trailing computations 306 having tags 310. The multiple trailing computations 306 may be verified in SFB 302 against leading computation 306 and/or other instances of trailing computations 306.

In an embodiment, workgroup 308 includes a workgroup identifier. A workgroup identifier uniquely identifies workgroup 308. In an embodiment, workgroup identifier may be included in instances of computation 306 and output 304.

For example, in FIG. 3, the illustrative two instances of computation 306 from workgroup 308 are generated in the GPU, such as, computation 306A and 306B. In an embodiment, tag 310A is associated with computation 306A and tag 310B is associated with computation 306B. SFB 302, however, may be adapted to verify multiple instances of computation 306.

As described above, tag 310 may store a single bit. The bit identifies whether computation 306 is a leading or trailing computation. For example, a bit set to "1" may identify a leading computation 306, whereas a bit set to "0" may identify a trailing computation 306. When SFB 302 verifies multiple instances of computation 306, tag 310 may store multiple bits. For example, tag 310 may be two bits to verify up to four instances of computation 306, and three bits to verify up to eight instances of computation. For illustrative purposes, tag 310A in FIG. 3 identifies computation 306A as a leading computation and tag 310B identifies computation 306B as a trailing computation.

The processed instances of computation 306 generate instances of output 304. In an embodiment, output 304 also includes tag 310 (not shown) and a workgroup identifier. Instances of computation 306 may be processed on the same or different compute units, as described in FIGS. 1 and 2 above. For example, computation 306A generates output 304A, and computation 306B generates output 304B. In an embodiment, output 304 may be output generated using instances of computation 306, using single or multiple compute units. In another embodiment, output 304 may be output that passed through one or more memory buffers of memory caches described in FIGS. 1 and 2, although the subject matter is not limited to this embodiment.

SFB 302 receives output 304, such as output 304A and 304B and verifies the received output. SFB 302 is a hardware structure that may be inserted at various points in FIGS. 1 and 2. In one embodiment, SFB 302 may be inserted in the hardware of compute unit 102 before output 110 reaches L1 cache 118 in FIG. 1. In FIG. 2, in an embodiment, SFB 302 may be inserted between XBAR FIFO 218 and XBAR 220. In another embodiment, SFB 302 may be inserted between XBAR 220 and L2 FIFO 212. In another embodiment, SFB 302 may be inserted between L2 FIFO 212 and L2 cache 214. In another embodiment, SFB 302 may be inserted between L2 cache 214 and L2 memory FIFO 216. The subject matter, however, is not limited to these embodiments.

SFB 302 generates entries 303 that are associated with instances of computation 306 and output 304. In an embodiment, SFB 302 generates a separate entry 303 for instances of output 304 of the leading and trailing computation 306. For example, SFB 302 generates entry 303A for output 304A, and entry 303B for trailing output 304B.

Entry 303 includes a label 312, a workgroup identifier 314 (also referred to as "workgroup ID 314"), a CRC data 316 and a CRC address 318. When SFB 302 receives an instance of output 304, it retrieves tag 310, a workgroup identifier, data and a storage address for the data from output 304. SFB 302 stores tag 310 in label 312 and workgroup identifier in workgroup ID 314.

In an embodiment, SFB 302 generates a signature of the data and the storage address of output 304. One signature for data and another signature for the storage address. To generate a signature, SFB 302 processes the data and the storage address in an error detecting hardware. In one embodiment, the error detecting hardware may be implemented as a cyclic redundancy check (CRC), although the subject matter is not limited to this embodiment. A CRC is an error-checking code used in electronic devices to detect accidental changes in data and data errors. A person skilled in the art will appreciate that a CRC requires a divisor, which may be a predetermined polynomial or a bit sequence. In an embodiment, data or storage address of output 304 is the dividend. When CRC applies the divisor to the dividend, the quotient is discarded, and the remainder is stored in SFB 302. The remainder is a signature that may be associated with the data and the storage address.

SFB 302 then applies the remainder to the checksum value that includes previous data and addresses executed by instances of computation 306 to generate the signature. SFB 302 stores the value of the checksum for data in CRC data 316 and the value of the checksum for the storage address in CRC address 318.

In an embodiment, SFB 302 generates the checksum stored in CRC data 316 and CRC address 318 for every output 304 that the GPU issues to the memory system.

In an embodiment, SFB 302 stores CRC data 316 and CRC address 318 for the leading and trailing instances.

When SFB 302 generates the remainder and stores the remainder as a checksum in CRC data 316 and CRC address 318 for output 304, SFB 302 allows the leading instance of output 304, such as output 304A to proceeds and update the memory subsequent to SFB 302. SFB 302 however, prevents the trailing instance of output 304, such as output 304B from updating the memory. For example, if SFB 302 is located between L1 FIFO 212 and L2 cache 214 (not shown), SFB 302 may allow output 210A to update L2 cache 214 and prevent output 210B and prevent output 210B from updating L2 cache 214.

In an embodiment, a GPU also provides synchronization points in SFB 302. At a synchronization point, SFB 302 compares the signature in CRC data 316 and CRC data 318 of the leading and trailing output 304 that have the same workgroup identifier. When verification is successful, the content of output 304 is error-free and does not contain data errors related to data and address storage.

Synchronization barriers may be inserted in multiple points as a GPU processes the workgroup. In one embodiment, a barrier may be inserted as a barrier instruction into an application by a developer. In another embodiment, barrier may be inserted by a compiler or finalizer to ensure synchronization at workgroup completion boundaries, prior to input/output (I/O) operations or prior to backing an application state for recovery, to name a few examples. In another embodiment, barrier may be inserted by hardware of the GPU or another processor.

When SFB 302 receives a barrier instruction, SFB 302 compares the signatures stored in CRC data 316 and CRC address 318 for the leading and trailing outputs 304. To compare the signatures, SFB 302 may wait until GPU completes the processing of all instances of computation 306 up to the barrier instruction. To determine whether output 304A is the same as output 304B, SFB 302 compares CRC data 316A associated with the leading output 304A to CRC data 316B associated with the trailing output 304B, in one embodiment. When CRC data 316A is equal to CRC data 316B and CRC address 318A is equal to CRC address 318B, verification succeeds. Otherwise, verification fails. When verification fails, SFB 302 determines that a data error occurred. When a verification error occurs, a GPU may raise an exception that initiates data correction and/or recovery, may initiate a shutdown of the system, or perform another predetermined recovery action.

In another embodiment, leading output 304A and trailing output 304B update the same SFB entry 303. For example, data associated with output 304A and output 304B both update CRC data 316, and the storage address associated with output 304A and output 304B both update CRC address 318. In this embodiment, when SFB 302 receives a barrier instruction, SFB 302 compares the signatures stored in CRC data 316 and CRC address 318 to zero. To compare the signature to zero, SFB 302 waits until it receives output 304A and 304B from computations 306A and 306B prior to the barriers instruction. Once CRC data 316 and CRC address 318 are updated, SFB 302 divides CRC data 316 and CRC address 318 by the divisor. When the remainder of the division is zero, the verification succeeds. When the remainder is not zero, SFB 302 determines that a data error occurred and raises an exception that initiates data correction and/or recovery.

Figure 4:
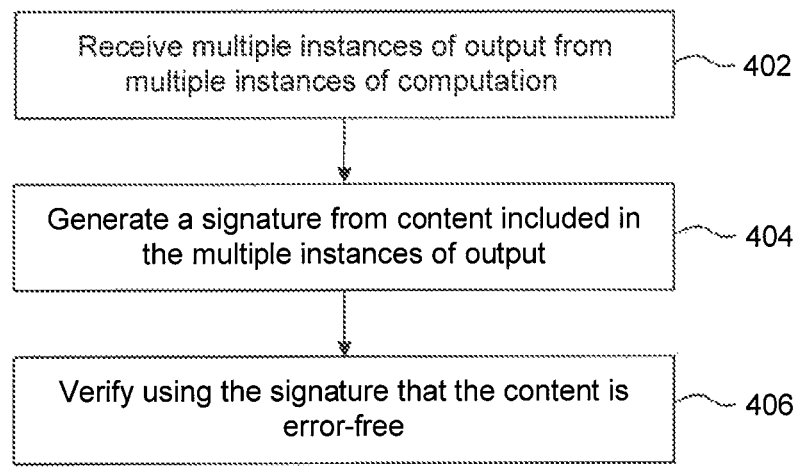
FIG. 4 is a flowchart of a method for verifying output generated by redundant computations, according to an embodiment.

FIG. 4 is a flowchart of a method 400 for verifying output generated by redundant computations, according to an embodiment.

At operation 402, instances of output are received. For example, SFB 302 receives multiple instances of output 304, where each instance of output 304 is associated with an instance of computation 306. In an embodiment, entry 303 may be created for output 304. In another embodiment, different entries, such as entry 303A and 303B may be created for a leading and trailing instance of output 304, such as output 304A and 304B.

At operation 404, signatures are generated. For example, when SFB 302 receives an instance of output 304, SFB 302 generates signatures from data and storage address included in the instance of output 304. The signatures are stored in entries 303. The signature associated with the data may be stored in CRC data 316 as a checksum of the signature and previous signatures generated by SFB 302 for instances of output 304 having the same workgroup ID. The signature associated with the storage address may be stored in CRC address 318 as a checksum of the signature and previous signatures generated by SFB 302 for instances of output 304 having the same workgroup ID. For example, signatures associated with data and storage address of output 304A are stored in CRC data 316A and CRC address 318A, and signatures associated with data and storage address of output 304B are stored in CRC data 316B and CRC address 318B.

At operation 406, signatures are verified. For example, SFB 302 verifies signatures in CRC data 316 and CRC address 318 when it receives a barrier instruction. In one embodiment, when SFB 302 receives a barrier instruction SFB 302 compares CRC data 316A against the CRC data 316B, and CRC address 318A against the CRC address 318B. In another embodiment, SFB 302 compares CRC data 316 and CRC address 318 against zero. As discussed above, in this embodiment, signatures from leading output 304A and trailing output 304B having the same workgroup ID are stored in CRC data 316 and CRC address 318 of the same entry 303.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as memory system and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of electronic devices (e.g., ASICs, or processors) to perform embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system, comprising:
   a hardware-based store fingerprint buffer installed in an electronic circuit that processes data in parallel and configured to perform operations comprising:

receiving a first instance of output associated with a first instance of computation;

receiving a second instance of output associated with a second instance of computation, wherein the first and second instances of the computation are part of a workgroup adapted for parallel execution;

generating a leading signature associated with a portion of content of the first instance of output;

generating a trailing signature associated with a portion of content of the second instance of output, wherein the leading signature and the trailing signature are stored in different memory locations associated with the hardware-based store fingerprint buffer; and verifying that the content is error-free by comparing the leading signature and the trailing signature.

2. The system of claim 1, further comprising a graphics processing unit (GPU) configured to include the hardware-based store fingerprint buffer.

3. The system of claim 1, further comprising a compute unit configured to include the hardware-based store fingerprint buffer.

4. The system of claim 1, wherein the content in the first instance of output includes data and storage address for the data.

5. The system of claim 1, wherein the hardware-based store fingerprint buffer is further configured to generate the signature by generating a signature associated with data included in the first instance of output, wherein the signature is a checksum of the data in the first instance of output and data in a previous instance of output associated with the instance of computation.

6. The system of claim 1, wherein the portion of the content of the first instance of output and the second instance of output is data.

7. The system of claim 1, wherein the portion of the content of the first instance of output and the second instance of output are storage addresses for data.

8. The system of claim 1, wherein the hardware-based store fingerprint buffer is further configured to:
compare content in the memory locations to zero to verify the content is error-free.

9. The system of claim 1, wherein the hardware-based store fingerprint buffer is further configured to:
receive a barrier instruction, wherein the barrier instruction is an indication to the fingerprint buffer to verify the signature;
confirm that instances of output associated with multiple instances of computation were processed by the store fingerprint buffer prior to the store fingerprint buffer verifying the signature.

10. The system of claim 1, wherein the instances of computation are redundant.

11. A method for optimizing redundant output verification, comprising:
receiving, in a hardware-based store fingerprint buffer installed in an electronic circuit that processes data in parallel, a first instance of output associated with a first computation and a second instance of output associated with a second computation, wherein the first and second instances of the computation are part of a workgroup adapted for parallel execution;
generating a leading signature associated with a portion of content of the first instance of output;
generating a trailing signature associated with a portion of content of the second instance of output, wherein the leading signature and the trailing signature are stored in different memory locations associated with the hardware-based store fingerprint buffer; and
verifying that the content is error-free by comparing the leading signature and the trailing signature.

12. The method of claim 11, wherein a graphics processing unit (GPU) includes the hardware-based store fingerprint buffer.

13. The method of claim 11, wherein a compute unit includes the hardware-based store fingerprint buffer.

14. The method of claim 11, wherein the content in the first instance of output includes data and storage address for the data.

15. The method of claim 11, wherein the generating further comprises:
generating a signature associated with data included in the first instance of output, wherein the signature is a checksum of the data in the first instance of output and data in a previous instances of output associated with the instance of computation.

16. The method of claim 11, wherein the portion of the content of the first instance of output and the second instance of output is data.

17. The method of claim 11, wherein the portion of the content of the first instance of output and the second instance of output are storage addresses for data.

18. The method of claim 11, wherein
the verifying includes comparing content in the memory locations to zero to verify the content is error-free.

19. The method of claim 11, further comprising:
receiving a barrier instruction, wherein the barrier instruction is an indication to the fingerprint buffer to verify the signature;
confirming that instances of output associated with multiple instances of computation were processed by the store fingerprint buffer prior to the store fingerprint buffer verifying the signature.

20. The method of claim 11, wherein the instances of computation are redundant.

* * * * *